(12) United States Patent
Kostadinova et al.

(10) Patent No.: US 11,068,564 B2
(45) Date of Patent: Jul. 20, 2021

(54) METHOD AND SYSTEM TO IDENTIFY IRREGULARITIES IN THE DISTRIBUTION OF ELECTRONIC FILES WITHIN PROVIDER NETWORKS

(71) Applicant: Technische Universität Wien, Vienna (AT)

(72) Inventors: Radostina Kostadinova, Vienna (AT); Peter Filzmoser, Vorau (AT); Nermina Mumic, Vienna (AT)

(73) Assignee: Technische Universität Wien, Vienna (AT)

( * ) Notice: Subject to any disclaimer, the term of this patent is extended or adjusted under 35 U.S.C. 154(b) by 0 days.

(21) Appl. No.: 16/614,208

(22) PCT Filed: May 18, 2018

(86) PCT No.: PCT/EP2018/063061
§ 371 (c)(1),
(2) Date: Nov. 15, 2019

(87) PCT Pub. No.: WO2018/211060
PCT Pub. Date: Nov. 22, 2018

(65) Prior Publication Data
US 2021/0073353 A1    Mar. 11, 2021

Related U.S. Application Data

(60) Provisional application No. 62/508,117, filed on May 18, 2017.

(51) Int. Cl.
*G06F 21/10* (2013.01)
*H04L 29/06* (2006.01)

(52) U.S. Cl.
CPC .......... *G06F 21/10* (2013.01); *H04L 63/1425* (2013.01); *G06F 2221/0775* (2013.01)

(58) Field of Classification Search
CPC ............ G06F 21/10; G06F 2221/0775; H04L 63/1425
See application file for complete search history.

(56) References Cited

U.S. PATENT DOCUMENTS

| 2008/0208526 | A1* | 8/2008 | Thibaux | G06K 9/00536 702/176 |
| 2009/0083132 | A1 | 3/2009 | Doganaksoy et al. | |
| 2014/0006325 | A1 | 1/2014 | Biem | |
| 2015/0161394 | A1* | 6/2015 | Ferragut | H04L 63/1425 726/25 |
| 2016/0219067 | A1* | 7/2016 | Han | H04L 63/1425 |

(Continued)

OTHER PUBLICATIONS

International Preliminary Report on Patentability Application No. PCT/EP2018/063061 Completed: Jun. 28, 2019 19 Pages.

(Continued)

*Primary Examiner* — David J Pearson
(74) *Attorney, Agent, or Firm* — Whitmyer IP Group LLC (57) ABSTRACT

A method to assess the distribution of electronic files within provider networks, wherein each provider network includes at least one server computer which distributes the electronic files to a multitude of client computers within the provider network. The present teaching also relates to an electronic data analysis device and a system for implementing such a method.

18 Claims, 7 Drawing Sheets

(56) References Cited

U.S. PATENT DOCUMENTS

2017/0019308 A1* 1/2017 Rapoport ................ H04L 41/12
2017/0124297 A1   5/2017 Baldwin et al.
2017/0126718 A1   5/2017 Baradaran et al.
2018/0324199 A1* 11/2018 Crotinger .............. G06F 16/248

OTHER PUBLICATIONS

International Search Report and Written Opinion of the International Searching Authority Application No. PCT/EP2018/063061 Completed: Jul. 18, 2018; dated Jul. 26, 2018 12 Pages.

* cited by examiner

METHOD AND SYSTEM TO IDENTIFY IRREGULARITIES IN THE DISTRIBUTION OF ELECTRONIC FILES WITHIN PROVIDER NETWORKS

TECHNICAL FIELD

The present teaching relates to a computer-implemented method, a data analysis device and a system to identify irregularities in the distribution of electronic files within provider networks.

BACKGROUND

It is known to distribute electronic files, such as electronic media files, particularly digital music files or digital video files, within provider networks from a server computer to one or a multitude of client computers which are members of the provider network. Well known provider networks of digital music files are, for example, known as Deezer, Google Play, Spotify, or Zune, while provider networks of digital video files are known as, for example, Netflix, Maxdome, or Amazon Prime.

Such electronic media files are provided for distribution by their respective right holders. These right holders receive data about the distribution of the electronic files within the provider networks. Based on the number of times the electronic file is distributed from a server computer to a client computer in these provider networks, the right holders receive revenue from the provider networks. However, with the growth of the digital multimedia industry and the resulting increase of revenues for music right holders, there arises a need of reliable tools to audit their portfolio of electronic files. In particular, irregularities in the distribution of the electronic files within the provider networks need to be detected, as such irregularities could be an indication of unauthorized distribution and fraud.

However, right holders do not have the technical means to directly assess the number of downloads of their electronic files from each of the server computers associated to the respective provider networks. Instead, they have to rely on the data provided by the provider networks themselves, which makes the detection of irregularities such as unauthorized distribution by the provider network impossible.

Online shops selling electronic files, such as electronic books or software, face a similar problem, in that the sale numbers of their electronic products usually undergo substantial fluctuations. The owners of the respective electronic files do not have means to directly assess the number of downloads of their electronic products from each of the server computers associated to the respective provider networks.

The document US 2014/006325 A1 shows a method to detect anomalies in a data processing environment, arising from, for example, bottle necks, memory leaks or hardware failures. The document US 2017/0124297 A1 shows a method for preventing digital content misuse by analyzing content usage data in order to identify outliers.

SUMMARY

The object of the present teaching is therefore to provide a method, a device and a system to automatically identify irregularities in the distribution of electronic files in provider networks, such as the unauthorized distribution of such electronic files.

This and other objects are solved by a method and a system according to the independent claims.

According to the present teaching, a computer-implemented method to identify irregularities in the distribution of electronic files within provider networks is provided, wherein each provider network comprises at least one server computer which is adapted to distribute the electronic files to a multitude of client computers within the provider network. The method comprises the following steps: defining, by a selection unit in a data analysis device, a number N of discrete time periods $t_1 \ldots t_N$, selecting, by the selection unit, out of the electronic files a specific query file, selecting, by the selection unit, a set of D provider networks, acquiring, by an acquisition unit in the data analysis device, from the D server computers associated with the D selected provider networks, a set of time series data streams $p(t)=p_1(t), p_2(t), \ldots, p_D(t)$, which are indicative of a common metric that has been associated to the query file, performing, by a transformation unit in the data analysis device, a transformation on $p(t)$ to compute a compositional data set $z(t)=z_1(t), z_2(t), \ldots, z_D(t)$, filtering, by a filtering unit in the data analysis device, the values of $z(t)=z_1(t), z_2(t), \ldots, z_D(t)$ using a local robust filtering model to compute local estimates $\tilde{\mu}(t)=\widetilde{\mu_1}(t), \widetilde{\mu_2}(t) \ldots, \widetilde{\mu_D}(t)$ computing, by an outlier detection unit in the data analysis device, the residuals $r_l(t)=z_l(t)-\widetilde{\mu_l}(t)$ for $l=1, 2, \ldots, D$, and performing a multivariate outlier detection on $r_l(t)$ to calculate an outlier metric.

It can be provided that, in order to calculate the outlier metric, a univariate outlier detection is performed on $r_l(t)$ as well and compared to the results of the multivariate outlier detection on $r_l(t)$.

It can be provided that, responsive to the calculated outlier metric, an evaluation and reporting unit in the data analysis device displays the calculated outlier metric on a display device.

It can be provided that, responsive to the calculated outlier metric, an evaluation and reporting unit in the data analysis device compares the calculated outlier metric with historical or predetermined threshold values and outputs an alert signal on a display device if the threshold values are exceeded.

It can be provided that, responsive to the calculated outlier metric, an evaluation and reporting unit in the data analysis device computes a set of control data to control the distribution of electronic files in the provider networks, and the data analysis device sends the control data to the server computers, wherein the control data causes the server computers to amend the distribution of electronic files.

It can be provided that the values $p_1(t), p_2(t), \ldots, p_D(t)$ are indicative of the number of client computers to which the query file has been distributed by the server computers.

It can be provided that the values $p_1(t), p_2(t), \ldots, p_D(t)$ are indicative of the number of times the query file has been distributed by the server computers.

It can be provided that the electronic files are electronic media files, such as electronic book files, software packages, audio files, particularly digital music files, or video-files such as digital video files in MPG or any other digital video format.

It can be provided that, by an internal storage unit of the data analysis device, model data is transmitted to the transformation unit, the filtering unit and/or the outlier detection unit, as well as historical data is transmitted to the evaluation and reporting unit.

It can be provided that the method according to the present teaching is used in an automated auditing process to assess irregularities in the distribution of electronic files within provider networks, wherein the time periods, the query file, and the provider networks are selected by the selection unit automatically using predefined lookup tables or statistical data.

The present teaching relates further to a computer-readable medium comprising computer-executable instructions causing an electronic device to perform the method according to the present teaching.

The present teaching relates further to an electronic data analysis device, comprising a processing unit, an internal memory and a communication unit which is configured to communicate with a multitude of server computers within provider networks which distribute electronic files to a multitude of client computers, wherein the data analysis device comprises a selection unit configured to define a number N of discrete time periods $t_1 \ldots t_N$, select out of the electronic files a specific query file, and select a set of D provider networks. The data analysis device further comprises an acquisition unit configured to acquire, from the D server computers associated with the D selected provider networks, a set of time series data streams $p(t)=p_1(t), p_2(t), \ldots, p_D(t)$ which are indicative of a common metric that has been associated to the query file, a transformation unit configured to perform an isometric log ratio transformation on $p(t)$ to compute a compositional data set $z(t)=z_1(t), z_2(t), \ldots, z_D(t)$, a filtering unit configured to filter the values of $z(t)=z_1(t), z_2(t), \ldots, z_D(t)$ using a local robust filtering model to compute local estimates $\hat{\mu}(t)=\widetilde{\mu_1}(t), \widetilde{\mu_2}(t) \ldots, \widetilde{\mu_D}(t)$, and an outlier detection unit configured to compute the residuals $r_l(t)=z_l(t)-\widetilde{\mu_l}(t)$ for l=1, 2, ..., D, and performing a multivariate outlier detection on $r_l(t)$, to calculate an outlier metric.

It can be provided that the electronic analysis device comprises an evaluation and reporting unit configured to compute a set of control data to control the distribution of electronic files in the provider networks responsive to the outlier metric, and that the data analysis device is configured to send the control data to the server computers.

The control data can be adapted to cause the server computers to amend the distribution of electronic files.

It can be provided that the electronic analysis device comprises an evaluation and reporting unit configured to display the outlier metric on a display device.

It can be provided that the electronic analysis device comprises an internal storage unit which is adapted to provide model data to the transformation unit, the filtering unit and the outlier detection unit, as well as to provide historical data to the evaluation and reporting unit.

The present teaching relates further to an electronic system comprising a multitude of provider networks with at least one server computer, characterized in that the system comprises at least one data analysis device according to the present teaching.

Each server computer can comprise a reporting unit adapted to prepare a time series data stream $p_i(t)$, and a communication unit adapted to transmit the data stream to the data analysis device and preferably receive control data from the data analysis device.

Further advantageous embodiments are defined in the dependent claims.

DETAILED DESCRIPTION

The present teaching is now described in more detail with respect to the accompanying drawings.

Figure 1:
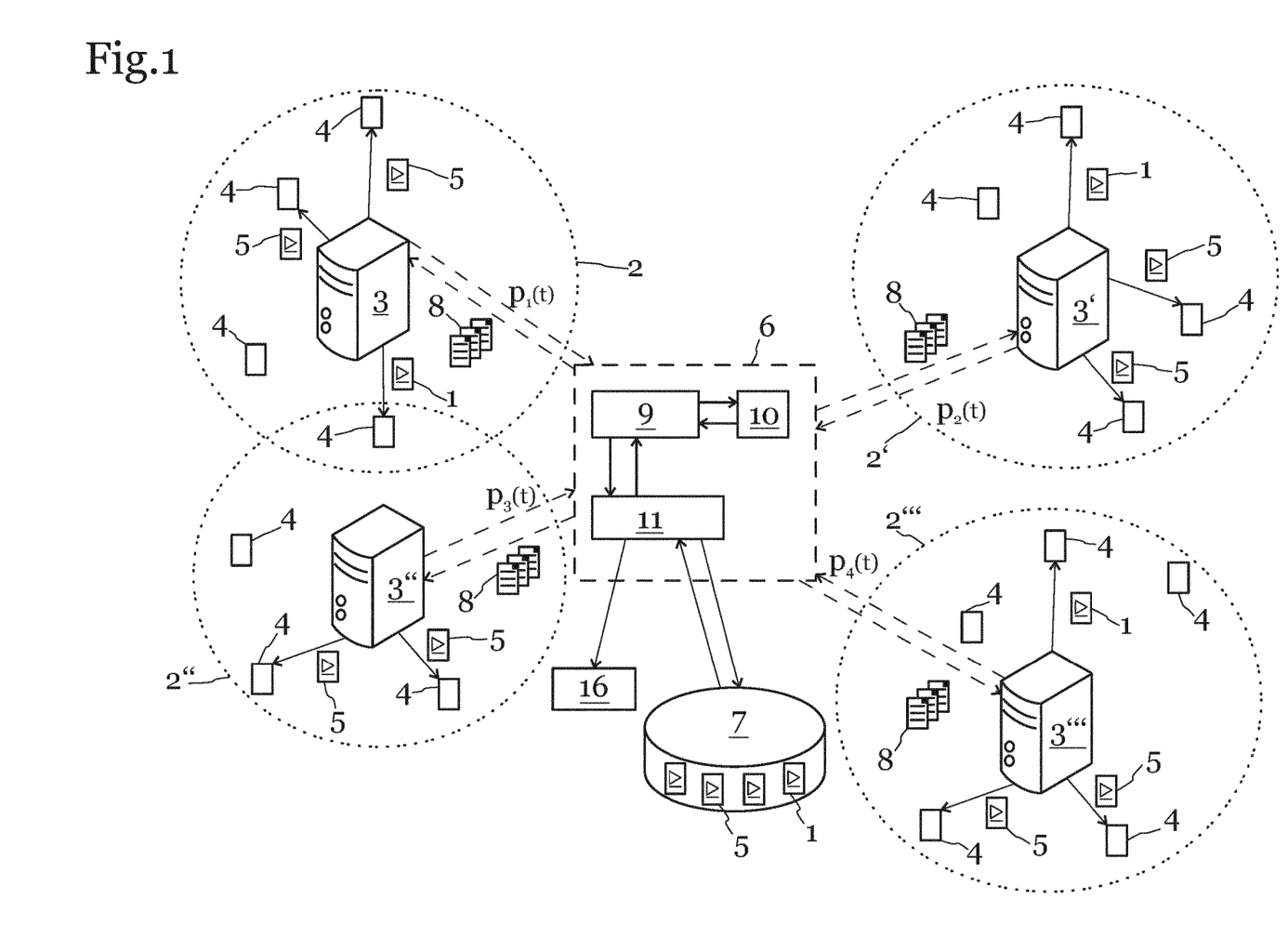
FIG. 1 illustrates a diagram of an example system, in which an embodiment of a method according to the present teaching is implemented.

FIG. 1 illustrates a diagram of an example system, in which an embodiment of a method according to the present teaching is implemented. The example system comprises several provider networks 2, 2', 2'', 2''' which are, for example, internet-based media distributing platforms such as Google Play, Deezer, Spotify, or Zune. Each provider network comprises at least one server computer 3, 3', 3'', 3'''. Each server computer is arranged to distribute a multitude of electronic files 1 to a multitude of client computers 4. Each client computer 4 is member of at least one provider network, but it is also possible that certain client computers 4 are members of more than one provider network.

The distribution of the electronic files 1 to the client computers can particularly be implemented by a selected downloading of the electronic files 1 upon request initiated on the client computers 4. Each client computer 4 can therefore be set up to receive electronic files 1 from one or several server computers 3.

Client computers 4 can comprise standard laptop and desktop computers as well as mobile electronic devices such as smartphones or any other computing device comprising electronic data communication equipment such as data transceivers to access server computers in remote provider networks, particularly with the capability to access the internet. However, it is also possible that client computers 4 access the server computers 3 via a LAN, WAN or proprietary network protocols.

Each server computer 3 stores a multitude of electronic files 1. The electronic files 1, in this embodiment, are electronic music files. In other embodiments, the electronic files 1 are electronic data files, electronic text files, or electronic video files.

The provider networks 3, in this embodiment, are digital music platforms such as Deezer, Google Play, Spotify, and Zune. The electronic files 1 in this embodiment are music files of artists that are sold on these platforms.

Upon request by one of the client computers 4, the server computer 3 transmits a specific electronic file 1 to the client computer 4. The server computer 3 is connected to the client computers 4 by data connections such as TCP/IP-connections. In particular, the client computers 4 are connected to the server computer 3 by the internet.

In order to control the distribution of the electronic files 1 through the server computers 3, and to detect irregularities, an electronic data analysis device 6 is provided.

The electronic data analysis device 6 comprises a processing unit 9, an internal memory 10 and a communication unit 11 which is configured to communicate with the server computers 3. The communication unit is further configured to communicate with an external electronic storage 7.

The processing unit 9 can comprise one or more processors, such as a microprocessor (CPU), a graphics processor (GPU), or application specific integrated circuits (ASIC). In alternative embodiments, the data analysis device 6 can comprise or access other computing resources such as cloud-based services that provide additional processing options for performing one or more of the determinations and calculations described in this specification.

The processing unit 9 is connected by an internal data link or data bus with the internal memory 10 and, in this embodiment, is adapted to execute programmed instructions stored in the internal memory 10 to cause the data analysis device 6 to perform one or more of the functions described herein.

Both the internal memory 10 and the electronic storage 7 can comprise one or more non-transitory machine-readable storage mediums, such as solid-state memory, magnetic disk, random-access-memory (RAM), read-only-memory (ROM), or any other tangible medium capable of storing information.

The data analysis device 6 is configured to communicate via the communication unit 11 to the server computers 3 of the different provider networks. In some embodiments, such communication unit 11 comprises hardware components such as an electronic modem or network card to perform electronic input and output operations. In particular, the communication unit is configured to access the server computers 3 via the internet using the TCP/IP-protocol.

The data analysis device 6 is adapted to provide the server computers 3, 3', 3", 3''' with the electronic files 1 to be distributed in the respective provider networks 2, 2', 2", 2''' associated to each server computer. For this, the data analysis device 6 is configured to query an electronic storage 7 which stores the electronic files 1 and metadata.

Alternatively, the data analysis device 6 is adapted to distribute DRM (digital rights management) data allowing the server computers 3, 3', 3", 3''' to access and distribute or download the respective electronic files 1 by themselves.

The data analysis device is further connected, via the communication unit 11, to a display device 16, such as an electronic screen, in order to display and report the calculated outlier metric in a suitable graphical representation.

To control the distribution of electronic files, the data analysis device 6 is configured to compute a set of control data 8 and send the control data 8 to the server computers 3 of each provider network. The control data 8 might also include the electronic files 1 to be distributed or a DRM (digital rights management) access code which allows the server computers 3 to access and distribute specific electronic files 1. The server computers 3 can be equipped with reception units to receive the control data 8 from the data analysis device 6.

In this embodiment, each provider network 2, 2', 2", 2''', associates a common metric to each electronic file 1 to be distributed. Such metric can be, in specific embodiments, a price associated with the electronic file 1 to be paid by a user at a client computer 4 upon downloading the electronic file 1. The chosen metric, such as the price of the electronic file, is common to each provider network, but the values might differ in different provider networks.

In some embodiments, the common metric can be a counter, a quality index, a file length, specific metadata of the electronic file 1 such as the date of creation, artist, ranking in specific charts, date of availability in the provider network, or any other data specific to the particular electronic file 1 within the particular provider network 2, 2', 2", 2'''.

For every distribution of an electronic file 1 within a provider network 2, the common metric associated to this electronic file 1 is recorded by the provider network 2, particularly by the server computer 3 of this provider network 2. Within dedicated time periods $t_1, t_2, \ldots, t_N$, the server computers 3 report the metrics p(t) for each of the distributed files to the data analysis device 6.

For example, in a specific embodiment, if a specific electronic file 1 has been distributed within a provider network 2 a certain number of times in a dedicated month, the server computer 3 of this provider network 2 reports this number to the data analysis device 6.

The server computers 3 can also report, for each electronic file 1, the revenue that was achieved within the provider network 2 by distributing this electronic file 1 to client computers 4 within the time period t. The server computers 3 can be retrofitted with report and transmission units to report the common metric values to the data analysis device 6.

In order to identify irregularities in the distribution of the electronic files within the provider networks, the data analysis device 6 selects a specific query file 5 out of the multitude of electronic files 1, and acquires from a number of D server computers 3 a set of time series data $p(t)=p_1(t), p_2(t), \ldots, p_D(t)$ which are indicative of a common metric that has been associated to the query file within predetermined time periods $t_1, t_2, \ldots, t_N$, such as the reported revenue with this file. The data flow showing the transmission of the time series data is indicated in the schematic figure with dotted lines.

Figure 2:
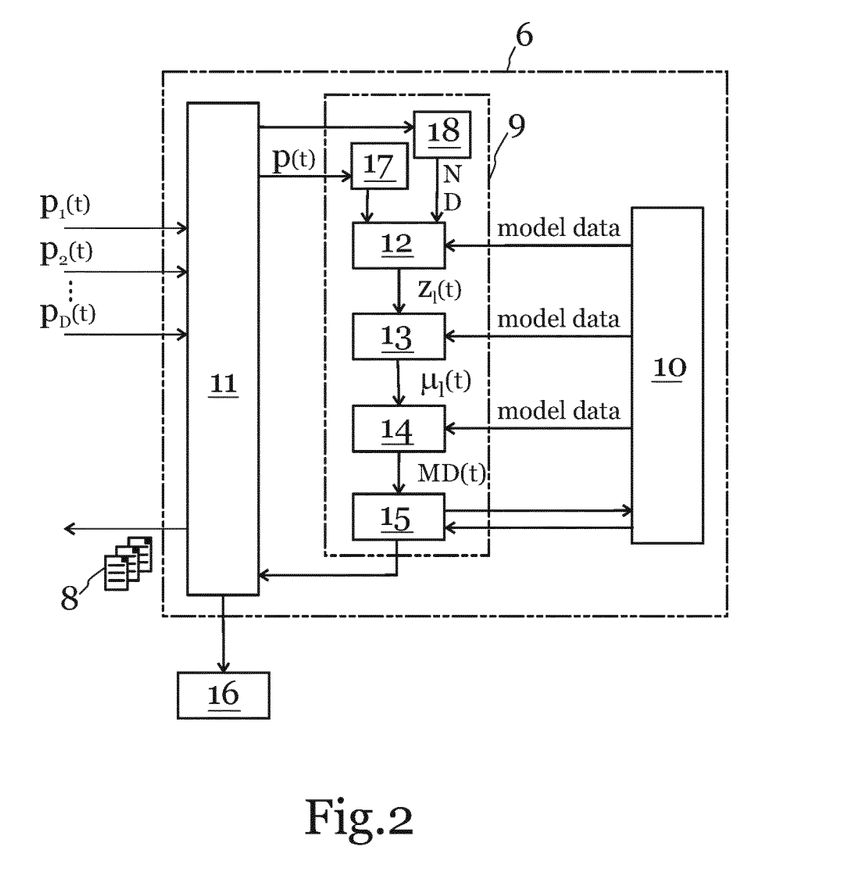
FIG. 2 illustrates a schematic diagram of a data analysis device 6 and the data flow in this device according to an embodiment of a method according to the present teaching.

FIG. 2 illustrates a schematic diagram of a data analysis device 6 and the data flow in this device according to an embodiment of a method according to the present teaching.

First, a selection unit 18 in the processing unit 9 of the data analysis device 6 selects a number N of discrete time periods $t_1, t_2, \ldots, t_N$. The selection unit 18 further selects, out of the available electronic files 1, a specific query file 5, for which the following auditing method shall be performed. The selection unit 18 then selects a number D of provider networks which are known to distribute the query file 5. For this, the selection unit 18 might query the internal memory 10 of the data analysis device 6.

An acquisition unit 17 in the processing unit 9 of the data analysis device 6, via the communication unit 11 of the data analysis device 6, queries the D server computers 3 and receives a number D of time series data streams $p_1(t), p_2(t), \ldots, p_D(t)$ from the server computers 3 associated with the D selected provider networks 2.

The values of $p_1(t), p_2(t), \ldots, p_D(t)$ are indicative of a common metric that has been associated to the query file 5.

Both the acquisition unit 17 and the selection unit 18 can be implemented in software, as a program module, or in hardware, as in an application-specific integrated circuit (ASIC) or in a field-programmable gate array (FGPA).

The received data streams enter a transformation unit 12 in the processing unit 9. The transformation unit 12 performs a transformation on the received data to calculate a compositional data set, wherein model data can be received from the internal storage 10 of the data analysis device 6. The transformation unit 12 can be implemented in software, as a program module, or in hardware, as in an application-specific integrated circuit (ASIC) or in a field-programmable gate array (FGPA).

The transformation unit 12 sends the transformed data $z_1(t), z_2(t), \ldots, z_D(t)$ to a filtering unit 13 in the processing unit 9. The filtering unit 13 filters the transformed data. For this, certain filtering model data is provided by the internal storage 10. The filtering unit 13 can be implemented in software, as a program module, or in hardware, as in an application-specific integrated circuit (ASIC) or in a field-programmable gate array (FGPA).

The filtering unit 13 sends the filtered data $\tilde{\mu}_l(t)$, for l=1, 2, ..., D−1, to an outlier detection unit 14. The outlier detection unit 14 performs an algorithm to detect outliers in the filtered data and calculates an outlier metric MD(t). For this, certain model data is provided by the internal storage 10. The outlier detection unit 14 can be implemented in software, as a program module, or in hardware, as in an application-specific integrated circuit (ASIC) or in a field-programmable gate array (FGPA).

The outlier detection unit 14 sends the calculated outlier metric MD(t) to an evaluation and reporting unit 15. The evaluation and reporting unit 15 prepares the outlier metric MD(t) for visual representation and determines, based on data provided by the internal storage 10, control data 8 to control the distribution of electronic files 1 in the provider networks 2.

The evaluation and reporting unit 15 sends the data to the communication unit 11, which forwards the data to the server computers 3 of the provider networks 2. The evaluation and reporting unit 15 can be implemented in software, as a program module, or in hardware, as in an application-specific integrated circuit (ASIC) or in a field-programmable gate array (FGPA).

The evaluation and reporting unit 15 can be adapted to access the internal storage 10 to compare the calculated outlier metric to historic data. It can also be adapted to prepare the control data 8 based on manual feedback of a user. In certain embodiments, the evaluation and reporting unit 15 is adapted to prepare data sets in order to visualize the outlier metric via the communication unit 11 on a display device 16. It can also be adapted to await manual feedback before preparing the control data 8. In other embodiments, the evaluation and reporting unit 15 can be adapted to prepare the control data 8 based on decision rule data stored in the internal memory 10 using look-up tables, historical data, deep learning or other methods.

Figure 3:
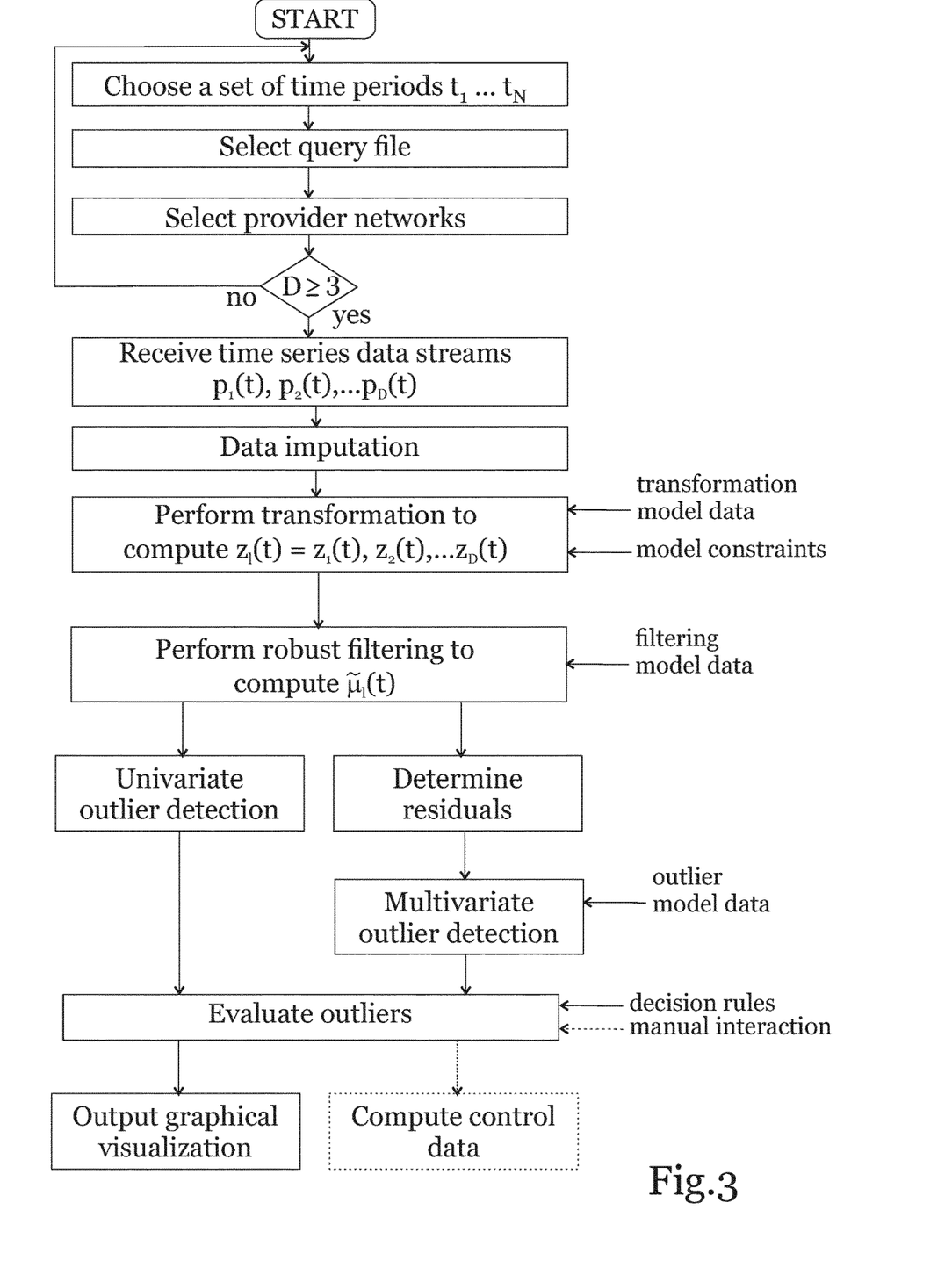
FIG. 3 illustrates a schematic data flow chart in an embodiment of a method according to the present teaching performed in a data analysis device according to the present teaching.

FIG. 3 illustrates a schematic data flow chart in an embodiment of a method according to the present teaching performed in a data analysis device according to the present teaching.

In the first steps, data is read in to the data analysis device. First, a number N of discrete time periods $t_1 \ldots t_N$ is chosen by the selection unit 18 in the processing unit 9 of the data analysis device 6. This number can be based on typical time periods in which file distribution irregularities are known to occur, such as days, weeks or months.

Then, by the selection unit 18, a specific query file 5 is selected among the multitude of electronic files 1 distributed within the provider networks 2. The choice can be made based on popularity or any other characteristic of the query file; it might also be a random choice between all electronic files available, or selected by manual input. The selection of the query file 5 can be made after querying the internal storage 10 or the external storage 7 of the data analysis device 6.

Then, by the selection unit 18, a number D of provider networks 2 is selected. The selection of provider networks 2 can be based on popularity or any other characteristic of the provider networks 2, it might also be a random choice or a manual selection. It can be provided that only provider networks 2 are selected which have received the query file 5 or its distribution rights. It can be provided that only provider networks 2 selected which are known by the data analysis device 6 to distribute the query file 5.

Since the described method only makes sense for three or more distinct provider networks, a check is done if D is equal or larger than three. If it is not, the method goes back to the start to change the time periods, query file and/or provider networks.

In the next step, the D server computers 3 associated with the D selected provider networks 2 are queried by an acquisition unit 17 in the processing unit 9 of the data analysis device 6 and time series data streams $p_1(t), p_2(t), \ldots, p_D(t)$ are received at the acquisition unit 17. The values of $p_1(t), p_2(t), \ldots, p_D(t)$ are indicative of a common metric that has been associated to the query file 5, such as the price of this electronic file.

In a specific embodiment, the values of $p_1(t_1) \ldots p_1(t_N)$ are the revenue reported by the first provider network 2 for distributing the query file 5, for example a specific song of a given artist, at the time periods $t_1 \ldots t_N$. Accordingly, the values of $p_2(t_1) \ldots p_2(t_N)$ are the revenues reported by the second provider network for distributing the query file 5 within the time periods $t_1 \ldots t_N$, and the value of $p_D(t_1) \ldots p_D(t_N)$ are the revenues reported by the D-th provider network for distributing the query file 5 within the time periods $t_1 \ldots t_N$.

In a specific example of a method according to the present teaching, the value of D is 3, and the value of N is 30, so that the vector $$p(t)=(p_1(t),p_2(t),p_3(t))$$

represents the composition of revenues from three selected provider networks in the time periods, for example months, t=1, 2, ..., 30.

Since the following transformation relies on a logarithmic transformation of the values of p(t), each single data point $p_i(t_j)$ must be greater than zero. For this, a separate data imputation routine is performed by the processing unit 9 of the data analysis device 6.

In this data imputation routine, first a statistical analysis is performed on the values reported by each provider network, and any zero values in the data stream is replaced by the 5%-quantile value of this specific provider network.

Alternatively, zeroes can be substituted with some small value, e.g. 0.01. It is also provided to substitute with values depending on the average relation of the component to the other components during the whole time period under consideration. In the next step, the received time series data streams are transformed in a transformation unit 12 in the processing unit 9 of the data analysis device 6 to compute a compositional data set. Using compositional data allows to analyze the data streams in relation to each other, so that irregularities with respect to the overall trend can more easily be identified.

Under the assumption that, for any given time period t, the total sum of revenue achieved by all D provider networks is a constant, $$p_i(t)>0, i=1, \ldots, D, \Sigma_{i=1}^{D} p_i(t)=c_t,$$

it follows that D-part compositions are only D−1 dimensional, i.e. have no direct representation in the Euclidean space, but only in the simplex space. An isometric log-ratio (logarithm of ratio) transformation ilr(p(t)) can be used to provide a one-to-one mapping from the restricted sample space to the real space. For a D-part composition, an isometric log-ratio transformation results in a D−1 dimensional real space representation. Such a transformation also offers useful properties such as isometry, i.e. that the Aitchison distance for two observations $p(t_1)$ and $p(t_2)$ is equal to the Euclidean distance of the transformed compositions $ilr(p(t_1))$ and $ilr(p(t_2))$.

The D-dimensional vector p(t) can thus be transformed into a compositional data set z(t) as follows:

$$ilr(\underset{T}{p(t)}) = ilr(p_1(t), \ldots, p_D(t)) = z(t) = (z_1(t), \ldots, z_{D-1}(T))$$

where the components of the vector z(t) are:

$$z_j(t) = \sqrt{\frac{D-j}{D-j+1}} \ln \frac{p_j(t)}{\sqrt[D-j]{\prod_{k=j+1}^{D} p_k(t)}} \text{ for } j = 1, \ldots, D-1$$

As the D−1 ilr-variables are coordinates of an orthonormal basis on the simplex w.r.t. the Aitchison geometry, a proper choice of this basis is crucial for their interpretation. In practice, the following D choices of orthonormal bases seem to be quite useful: Denote for l=1, . . . , D and time point t, the permutation of the compositional parts such that the l-th part is moved to the first position by:

$$p^{(l)}(t) = \left(p_1^{(l)}(t), p_2^{(l)}(t), \ldots, p_l^{(l)}(t), p_{l+1}^{(l)}(t), \ldots, p_D^{(l)}(t)\right)^\top :=$$

$$(p_l(t), p_1(t), \ldots, p_{l-1}(t), p_{l+1}(t), \ldots, p_D(t))^\top.$$

From this, the following (D−1) dimensional real vectors are obtained:

$$z_j^{(l)}(t) = \sqrt{\frac{D-j}{D-j+1}} \ln \frac{p_j^{(l)}(t)}{\sqrt[D-j]{\prod_{k=j+1}^{D} p_k^{(l)}(t)}} \text{ for } j = 1, \ldots, D-1.$$

In this setup, the first coordinate (ilr variable $z_1^{(l)}(t)$) consists of all the relative information (log-ratios) about the original compositional part $p_l(t)$, l=1, . . . , D. We denote $ilr(p_l(t)) = z_1^{(l)}(t)$, l=1, . . . , D, for a time point t. Note that the formulae for ilr(pl(t)) can be written as:

$$ilr(p_l(t)) = \sqrt{\frac{D-1}{D}} \ln \frac{p_l(t)}{\sqrt[D-1]{\prod_{k=1, k \neq l}^{D} p_k(t)}} \text{ for } l = 1, \ldots, D.$$

For an example with D=3, the components of the compositional data set z(t) have the following form:

$$ilr(p_1(t)) = \sqrt{\frac{2}{3}} \ln \frac{p_1(t)}{p_2(t) + p_3(t)}, \quad ilr(p_2(t)) = \sqrt{\frac{2}{3}} \ln \frac{p_2(t)}{p_1(t) + p_3(t)},$$

$$ilr(p_3(t)) = \sqrt{\frac{2}{3}} \ln \frac{p_3(t)}{p_1(t) + p_2(t)}$$

In other words, $z_1(t) = ilr(p_1(t))$ denotes the relation of the metrics reported by Deezer to the sum of the metrics reported by Google Play and the metrics of Zune, while $z_2(t) = ilr(p_2(t))$ denotes the relation of the metrics reported by Google Play to those of Deezer and Zune, and $z_3(t) = ilr(p_3(t))$ denotes the relation of the metrics reported by Zune to those reported by Google Play and Deezer. However, in this step, other transformation models can be used as well, wherein transformation model data and model constraints can be received by the transformation unit 12 from the internal memory 10.

In the next step, the compositional data is filtered in a filtering unit 13 in the processing unit 9 of the data analysis device 6 to remove unexpected deviations and random noise.

For this, the values of z(t) are modeled in a signal plus noise representation, where μ(t) denotes the smooth signal and ξ(t) a noise component:

$$z(t) = \mu(t) + \xi(t), t \in 1, \ldots, T.$$

To extract the signal μ(t) from z(t), a repeated median (RM) regression model is used, where it is assumed that the signal μ(t) can be locally approximated by a regression line within a short time window of length n:

$$\mu(t-n+i) \approx \mu(t) + \beta(t) \cdot (i-n), i=1, \ldots, n.$$

where μ(t−n+i) is the level of the regression line at the time point (t−n+i) and β(t) is the slope of the regression line. The regression estimates for the slope β(t) and the level μ(t) for a given sample $z(t) = (z(t-n+1), \ldots, z(t))$ can be calculated as:

$$\hat{\beta}(t) = \underset{i \in 1, \ldots, n}{\text{median}} \left\{ \underset{j \neq i}{\text{median}} \frac{z(t-n+i) - z(t-n+j)}{i-j} \right\},$$

$$\hat{\mu}(t) = \underset{i \in 1, \ldots, n}{\text{median}} \left\{ z(t-n+i) - \hat{\beta}(t) \cdot (i-n) \right\}.$$

The choice of the window width n is based on a test of the slopes of the regression line within the window using the well-known SCARM (Slope Comparing Adaptive Repeated Median) method. The local filtered values of the transformed data z(t) are denoted by $\hat{\mu}(t) = \widetilde{\mu_1}(t), \widetilde{\mu_2}(t), \ldots, \widetilde{\mu_D}(t)$. However, other filtering models can be used as well, wherein model data can be received at the filtering unit 13 from the internal memory 10.

The values of $z_l(t)$ or their local estimates $\widetilde{\mu_1}(t)$ can already be used to perform an univariate outlier detection separately for every relation of one provider network to the rest. However, such univariate outlier detection is not reliable and does not take into account all interactions between the variables. Univariate outlier detection can still be used in addition to multivariate outlier detection.

In the next step, the residual values between the compositional data set $z_l(t)$ and the local estimates $\widetilde{\mu_1}(t)$ are calculated in an outlier detection unit 14 in the processing unit 9 of the data analysis device 6:

$$r_l(t) = z_l(t) - \widetilde{\mu_1}(t), t=1, \ldots, T, l=1, \ldots, D.$$

Any major residual $r_l(t)$ is an indication of irregularities in the distribution of the respective electronic files within the different provider networks. In particular, in the case of negative residuals $r_l(t)$, this is an indication that the values of the reported revenues are lower than actually expected.

A multivariate outlier detection algorithm is applied in the outlier detection unit 14 to find such multivariate observations in the sample which deviate from the whole, taking into account all dimensions in the observation. Multivariate outlier detection can be based on the estimation of the covariance structure. In this context, one assigns a distance to each observation which indicates how remote it is from the center of the data, w.r.t. the covariance structure. This distance measure depends on the estimated covariance structure of the data and is the well-known Mahalanobis distance (MD), defined as:

$$MD(r(t)) = [(r(t)-m)C^{-1}(r(t)-m)] \text{ or } t=1,\ldots,T.$$

Here, m and C denote estimations for the location and the covariance, respectively. One can take the arithmetic mean and the sample covariance matrix, which prove to be very efficient in the case of normally distributed data. According to this embodiment, the result of the method according to the present teaching is an outlier metric, such as a list of time periods and provider networks where the value of MD exceeds a certain threshold value.

However, other outlier detection algorithms can be used as well, wherein outlier algorithm model data can be received at the outlier detection unit 14 from the internal memory 10.

The calculated outlier metric is sent to an evaluation and reporting unit 15 in the processing unit 9 of the data analysis device 6 to report outliers, and to create control data 8 in order to control the distribution of the query file 5 by the different provider networks. For example, the evaluation and reporting unit 15 might create control data 8 which causes provider networks to stop the further distribution of the query file 5. The data analysis device 6 might also block the provider network from distributing any further electronic files 1 at all.

In order to evaluate the calculated outlier metric, the evaluation and reporting unit 15 might receive decision rules from the internal memory 10. It is also provided that the outlier metric is visualized on a display device 16 of the data analysis device 6 and the device 6 waits for manual interaction responsive to the outlier metric.

Finally, the calculated outlier metric is output on the display device 16. Optionally, control data can be computed to control the future distribution of electronic files by the provider network.

FIGS. 4*a*-4*f* show several schematic data diagrams of the time-dependent data at several points within the data analysis device 6 when performing an embodiment of the present teaching.

Figure 4A:
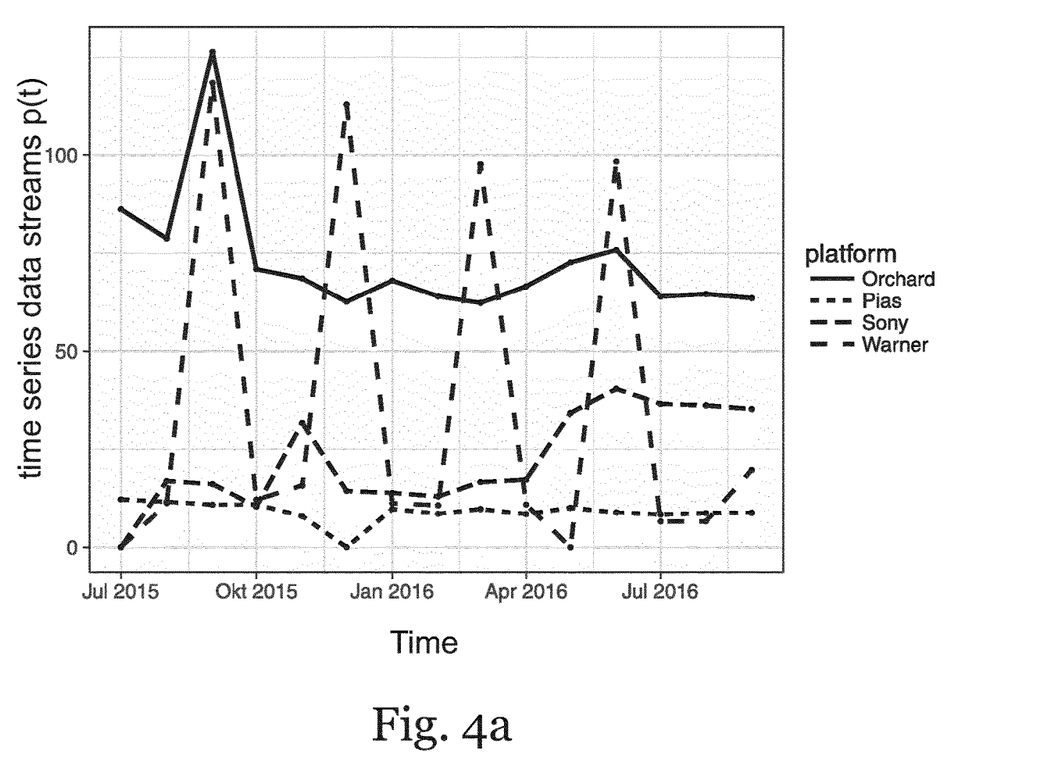
FIGS. 4a-4f show several schematic data diagrams of the time-dependent data at several points within the data analysis device 6 when performing an embodiment of the present teaching.
Figure 4B:
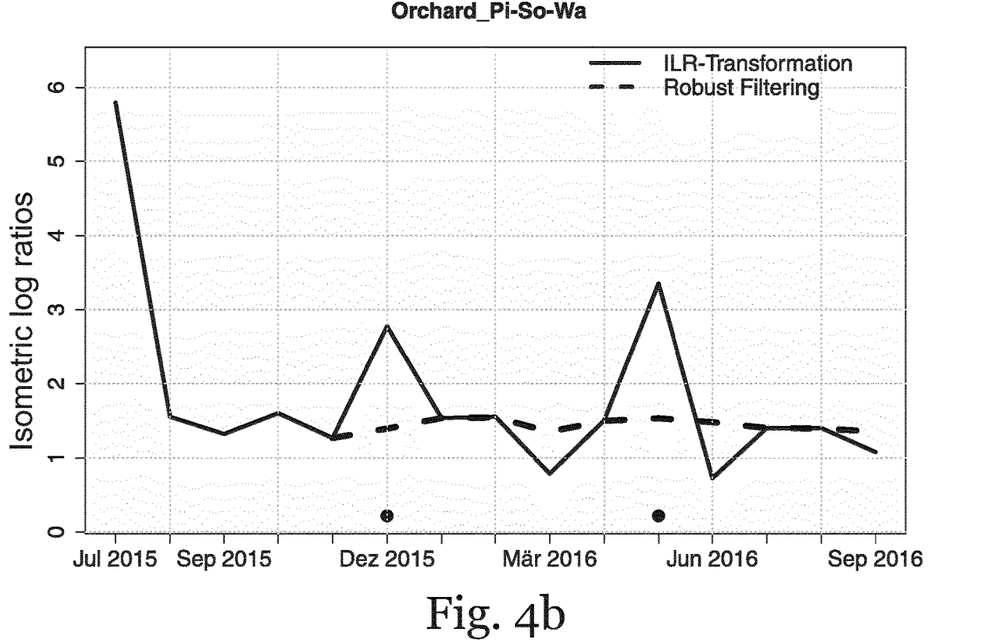
Figure 4C:
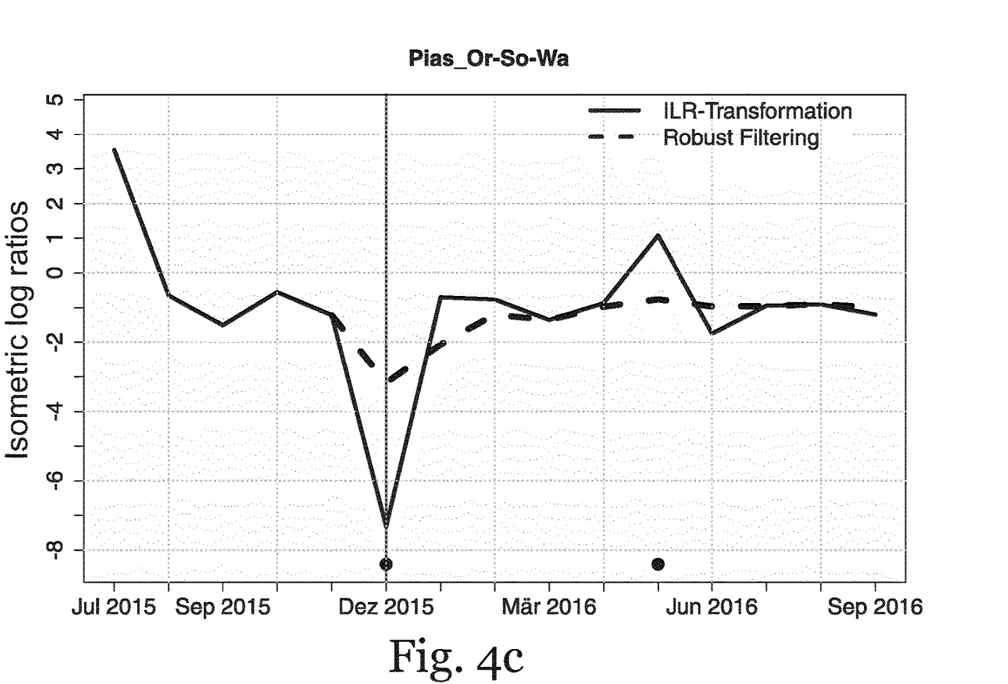
Figure 4D:
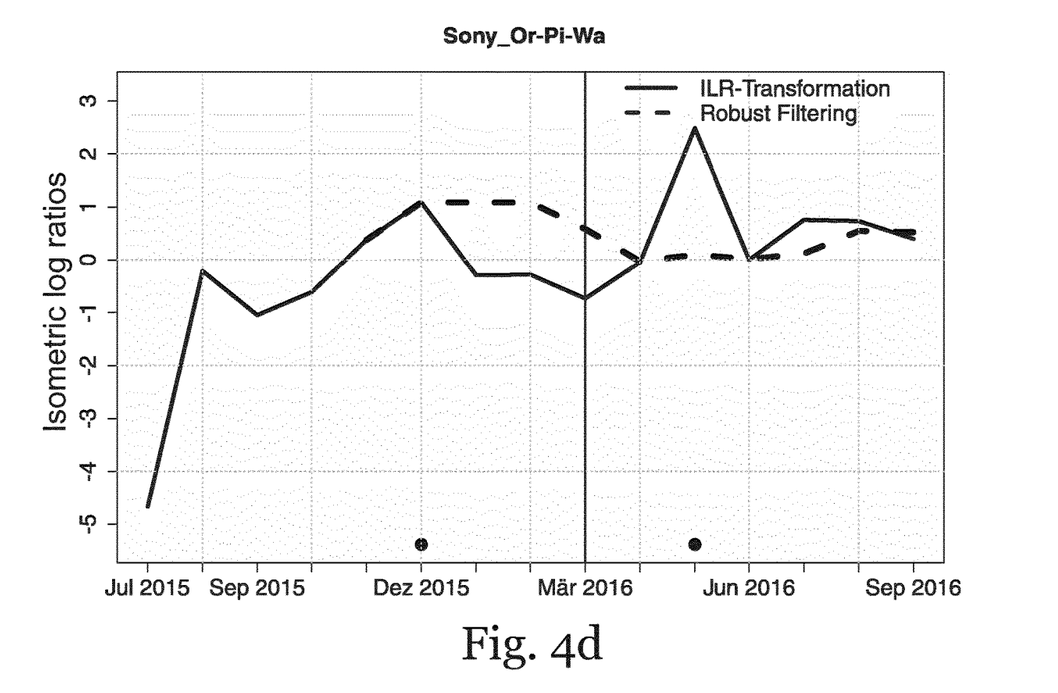
Figure 4E:
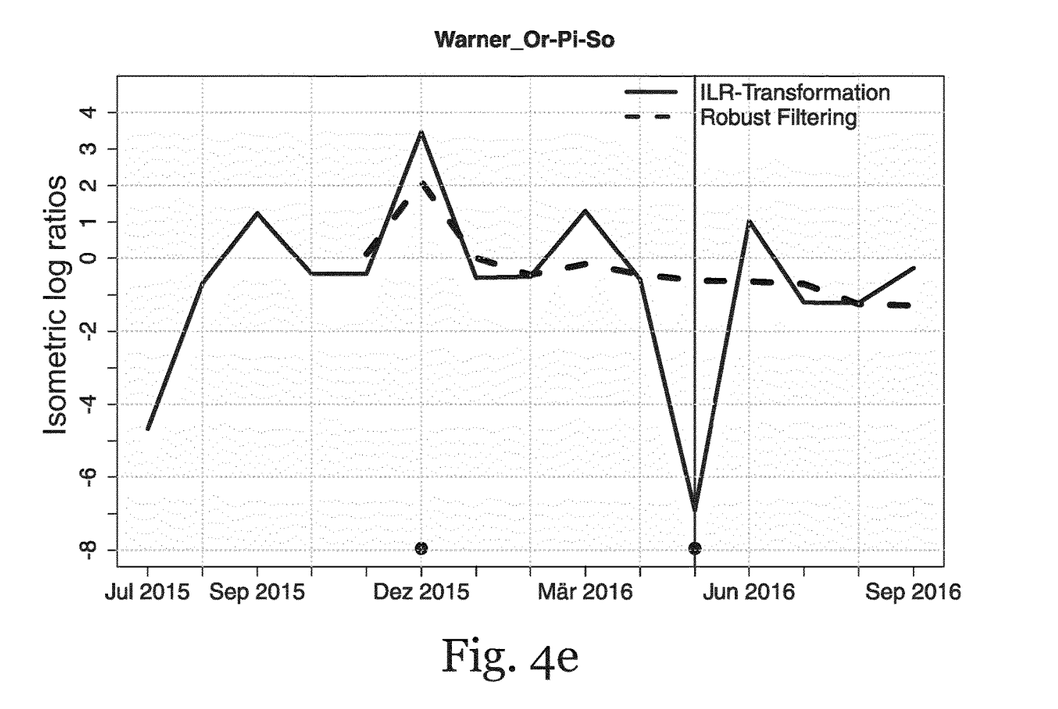

FIG. 4*a* shows a set of four time series data streams $p_1(t)$, $p_2(t)$, $p_3(t)$ and $p_4(t)$ received at the acquisition unit 17 of the data analysis device 6. It is shown that these time series data, which depict a common metric that has been associated to a specific query file 5, have positive values, which follow a common trend with visual deviations.

FIG. 4*b*-4*e* show the compositional data $z_1(t)$, $z_2(t)$, $z_3(t)$ and $z_4(t)$ which have been calculated from the time series data streams as described above. Further, the local filtered values are shown as dashed lines. The time periods in which multivariate outliers have been detected are denoted with a filled circle.

Figure 4F:
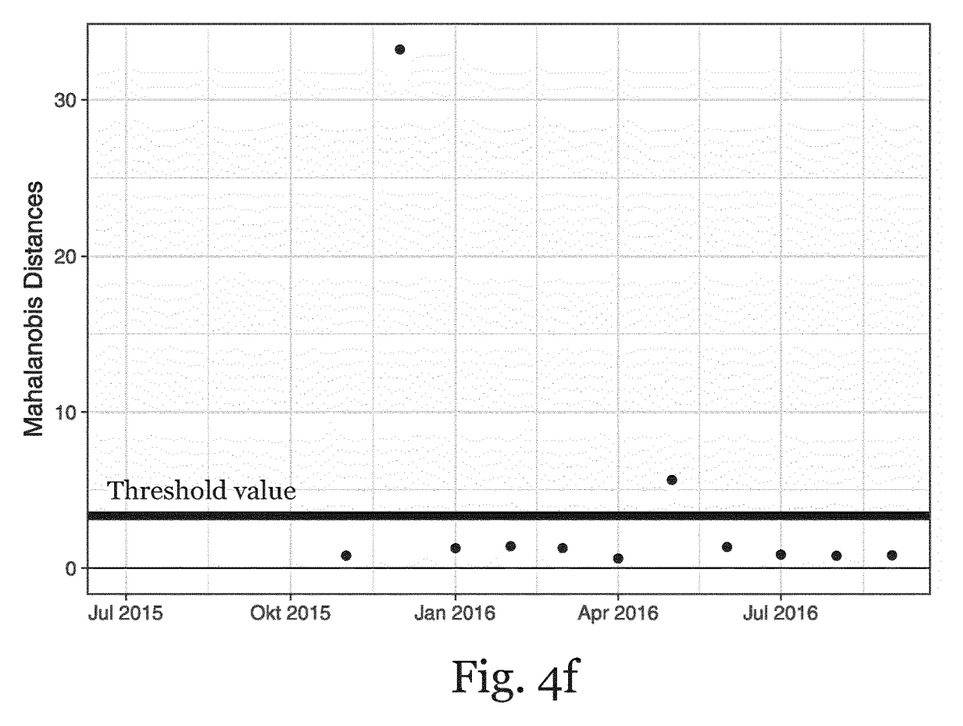

FIG. 4*f* shows the calculated values of the Mahalanobis distance MD(t) as calculated in the outlier detection unit 14. It can be seen that only at specific time periods, values of MD(t) occur which exceed a threshold value, which is indicated as a dashed line. These values indicate that at this time period, irregularities in the distribution of the electronic files within the provider network have occurred. By comparing the values of MD(t) with the values of the residuals $r_i(t)$, and optionally also with the results of the univariate outlier detection, the provider networks which caused the irregularities can be determined.

Embodiments of the present teaching can be implemented as a computer app executed on a smartphone or a tablet. Particularly, the data analysis device 6 can be implemented as a smartphone or tablet device running the method according to the present teaching. Alternatively, the display device 16 can be implemented as a smartphone or tablet device displaying the status and/or results of the method according to the present teaching.

Embodiments of the present teaching can be implemented in digital electronic circuitry, in tangibly-embodied computer software or firmware, in computer hardware, including the structures disclosed in this specification and their structural equivalents, or in combinations of one or more of them. Embodiments can be implemented as computer programs, i.e., modules of computer program instructions encoded on a tangible non transitory program carrier for execution by data processing apparatus. The computer storage medium can be a machine-readable storage device, a random or serial access memory device, or a combination of one or more of them.

A computer program according to the present teaching can be written in any form of programming language, including compiled or interpreted languages, or declarative or procedural languages, and it can be deployed in any form, including as a stand-alone program or as a module, component, subroutine, or other unit suitable for use in a computing environment. A computer program may correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. Such computer program can be deployed to be executed on one computer or on multiple computers that are located at one site or distributed across multiple sites and interconnected by a communication network.

The processes and logic flows described herein can be performed by one or more programmable computers executing one or more computer programs to perform functions by operating on input data and generating output. The processes and logic flows can be performed by, and apparatus can also be implemented as, special purpose logic circuitry, such as an FPGA (field programmable gate array), an ASIC (application specific integrated circuit), or a GPU (general purpose graphics processing unit).

Computers suitable for the execution of the method according to the present teaching can be based on general or special purpose microprocessors or on both, or any other kind of central processing unit (CPU). Such central processing unit will receive instructions and data from a read only memory or a random access memory or both.

The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer according to the present teaching can be embedded in another device, e.g., a mobile telephone, a smartphone, a tablet device, a mobile audio or video player, a game console, a Global Positioning System (GPS) receiver, or a portable storage device, e.g., a universal serial bus (USB) flash drive.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the present teaching can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any present teaching or of what may be claimed, but rather as descriptions of features that may be specific to particular embodiments of the present teaching. Certain features that are described in this specification in the context of separate embodiments can also be implemented in combination in a single embodiment. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method to identify irregularities in the distribution of electronic files within provider networks, wherein each provider network comprises at least one server computer which is adapted to distribute the electronic files to a multitude of client computers within the provider network, wherein the method includes the following steps:

a. defining, by a selection unit in a data analysis device, a number N of discrete time periods $t_1 \ldots t_N$,
   b. selecting, by the selection unit, out of the electronic files a specific query file,
   c. selecting, by the selection unit, a set of D provider networks, wherein the number D is equal or larger than three,
   d. acquiring, by an acquisition unit in the data analysis device, from the D server computers associated with the D selected provider networks, a set of time series data streams $p(t)=p_1(t), p_2(t), \ldots, p_D(t)$, which are indicative of a common metric that has been associated to the query file,
   e. performing, by a transformation unit in the data analysis device, an isometric logratio transformation on $p(t)$ to compute a compositional data set $z(t)=z_1(t), z_2(t), \ldots, z_D(t)$,
   f. filtering, by a filtering unit in the data analysis device, the values of $z(t)=z_1(t), z_2(t), \ldots, z_D(t)$ using a local robust filtering model to compute local estimates $\tilde{\mu}(t)= \widetilde{\mu_1}(t), \widetilde{\mu_2}(t) \ldots, \widetilde{\mu_D}(t)$, wherein repeated median regression is applied by the filtering unit and the choice of the regression window width is based on a test of the slopes of the regression line within the window using the SCARM (Slope Comparing Adaptive Repeated Median) method,
   g. computing, by an outlier detection unit in the data analysis device, the residuals $r_I(t)=z_I(t)-\tilde{\mu}_I(t)$ for $I=1, 2, \ldots, D$, and performing a multivariate outlier detection on $r_I(t)$ to calculate an outlier metric, and
   h. responsive to the calculated outlier metric, computing, by an evaluation and reporting unit in the data analysis device, a set of control data to control the distribution of electronic files in the provider networks, and sending the control data to the server computers, wherein the control data causes the server computers to amend the distribution of electronic files.

2. The method according to claim 1, wherein, in order to calculate the outlier metric, an univariate outlier detection is performed on $r_I(t)$ as well and compared to the results of the multivariate outlier detection on $r_I(t)$.

3. The method according to claim 1, wherein, responsive to the calculated outlier metric, an evaluation and reporting unit in the data analysis device displays the calculated outlier metric on a display device.

4. The method according to claim 1, wherein, responsive to the calculated outlier metric, an evaluation and reporting unit in the data analysis device compares the calculated outlier metric with historical or predetermined threshold values and outputs an alert signal on a display device if the threshold values are exceeded.

5. The method according to claim 1, wherein, the values $p_1(t), p_2(t), \ldots, p_D(t)$ are indicative of the number of client computers to which the query file has been distributed by the server computers.

6. The method according to claim 1, wherein, the values $p_1(t), p_2(t), \ldots, p_D(t)$ are indicative of the number of times the query file has been distributed by the server computers.

7. The method according to claim 1, wherein, the electronic files are electronic media files.

8. The method according to claim 7, wherein, the electronic media files comprise electronic book files, software packages, audio files, or video-files.

9. The method according to claim 8, wherein, the audio files are digital music files and the video files are digital video files in MPG or any other digital video format.

10. The method according to claim 1, wherein, by an internal storage unit of the data analysis device, model data is transmitted to the transformation unit, the filtering unit and/or the outlier detection unit, as well as historical data is transmitted to the evaluation and reporting unit.

11. The method according to claim 1, wherein, it is used in an automated auditing process to assess irregularities in the distribution of electronic files within provider networks, wherein the time periods, the query file, and the provider networks are selected by the selection unit automatically using predefined lookup tables or statistical data.

12. A non-transitory computer-readable medium comprising computer-executable instructions causing an electronic device to perform the method according to claim 5.

13. An electronic data analysis device, comprising a processing unit, an internal memory and a communication unit which is configured to communicate with a multitude of server computers within provider networks which distribute electronic files to a multitude of client computers, wherein the data analysis device comprises:
   a. a selection unit configured to
      i. define a number N of discrete time periods $t_1 \ldots t_N$,
      ii. select out of the electronic files a specific query file,
      iii. select a set of D provider networks, wherein the number D is equal or larger than three,
   b. an acquisition unit configured to acquire, from the D server computers associated with the D selected provider networks, a set of time series data streams $p(t)=p_1(t), p_2(t), \ldots, p_D(t)$ which are indicative of a common metric that has been associated to the query file,
   c. a transformation unit configured to perform an isometric logratio transformation on $p(t)$ to compute a compositional data set $z(t)=z_1(t), z_2(t), \ldots, z_D(t)$,
   d. a filtering unit configured to filter the values of $z(t)=z_1(t), z_2(t), \ldots, z_D(t)$ using a local robust filtering model to compute local estimates $\tilde{\mu}(t)=\widetilde{\mu_1}(t), \widetilde{\mu_2}(t) \ldots, \widetilde{\mu_D}(t)$, wherein repeated median regression is applied by the filtering unit and the choice of the regression window width is based on a test of the slopes of the regression line within the window using the SCARM (Slope Comparing Adaptive Repeated Median) method,
   e. an outlier detection unit configured to compute the residuals $r_I(t)=z_I(t)-\tilde{\mu}_I(t)$ for $I=1, 2, \ldots, D$, and performing a multivariate outlier detection on $r_I(t)$, to calculate an outlier metric, and
   f. an evaluation and reporting unit configured to compute a set of control data to control the distribution of electronic files in the provider networks responsive to the outlier metric, and that the data analysis device is configured to send the control data to the server computers, wherein the control data is adapted to cause the server computers to amend the distribution of electronic files.

14. The electronic data analysis device according to claim 13, wherein it includes an evaluation and reporting unit configured to display the outlier metric on a display device.

15. The electronic data analysis device according to claim 13, wherein it includes an internal storage unit which is adapted to provide model data to the transformation unit, the filtering unit and the outlier detection unit, as well as to provide historical data to the evaluation and reporting unit.

16. An electronic system comprising a multitude of provider networks each with at least one server computer, wherein the system includes at least one data analysis device according to claim 13.

17. The electronic system according to claim 16, wherein each server computer includes a reporting unit adapted to prepare a time series data stream $p_i(t)$, and a communication unit adapted to transmit the data stream to the data analysis device and preferably receive control data.

18. A computer-implemented method to identify irregularities in the distribution of electronic files within provider networks, wherein each provider network comprises at least one server computer which is adapted to distribute the electronic files to a multitude of client computers within the provider network, wherein the method includes the following steps:
   a. defining, by a selection unit in a data analysis device, a number N of discrete time periods $t_1 \ldots t_N$,
   b. selecting, by the selection unit, out of the electronic files a specific query file,
   c. selecting, by the selection unit, a set of D provider networks, wherein the number D is equal or larger than three,
   d. acquiring, by an acquisition unit in the data analysis device, from the D server computers associated with the D selected provider networks, a set of time series data streams $p(t)=p_1(t), p_2(t), \ldots, p_D(t)$, which are indicative of a common metric that has been associated to the query file,
   e. performing, by a transformation unit in the data analysis device, an isometric logratio transformation on $p(t)$ to compute a compositional data set $z(t)=z_1(t), z_2(t), \ldots z_D(t)$,
   f. filtering, by a filtering unit in the data analysis device, the values of $z(t)=z_1(t), z_2(t), \ldots, z_D(t)$ using a local robust filtering model to compute local estimates $\tilde{\mu}(t)=\widetilde{\mu_1}(t), \widetilde{\mu_2}(t) \ldots, \widetilde{\mu_D}(t)$, wherein repeated median regression is applied by the filtering unit and the choice of the regression window width is based on a test of the slopes of the regression line within the window using the SCARM (Slope Comparing Adaptive Repeated Median) method,
   g. computing, by an outlier detection unit in the data analysis device, the residuals $r_I(t)=z_I(t)-\tilde{\mu}_I(t)$ for $I=1, 2, \ldots, D$, and performing a multivariate outlier detection on $r_I(t)$ to calculate an outlier metric, and
   h. preparing, by an evaluation and reporting unit in the data analysis device, the calculated outlier metric for visualization on a display device, and processing, by the evaluation and reporting unit, user feedback responsive to the calculated outlier metric to determine data for controlling the distribution of the query file in the provider networks.

* * * * *